(12) United States Patent
Mak

(10) Patent No.: US 7,483,641 B1
(45) Date of Patent: Jan. 27, 2009

(54) OPTICAL HYBRID

(75) Inventor: Gary Mak, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 560 days.

(21) Appl. No.: 10/884,949

(22) Filed: Jul. 7, 2004

(51) Int. Cl.
*H04B 10/00* (2006.01)

(52) U.S. Cl. ............... 398/204; 398/203; 398/202

(58) Field of Classification Search ......... 398/202–214
See application file for complete search history.

(56) References Cited

U.S. PATENT DOCUMENTS

| 5,463,461 | A | * | 10/1995 | Horiuchi et al. | ............. | 356/484 |
| 6,026,202 | A | * | 2/2000 | Chang | .................. | 385/11 |
| 6,088,491 | A | | 7/2000 | Sorin et al. | | |
| 2004/0096143 | A1 | * | 5/2004 | Shpantzer et al. | ............. | 385/16 |

OTHER PUBLICATIONS

M. Oskar van Deventer, Phase-Diversity Hybrid Optimization in Case of a Two-Detector Receiver, IEEE Photonics Technology Letters, vol. 4, No. 9, Sep. 1992, pp. 1060-1062.
D. Hoffmann et al.: Integrated Optics Eight-Port 90° Hybrid on LiNbO₃, Journal of Lightwave Technology, vol. 7, No. 5, May 1989, pp. 794-798.
F. Ghirardi et al.: Monolithic Integration of an InP Based Polarization Diversity Heterodyne Photoreceiver with Electrooptic Adjustability, Journal of Lightwave Technology, vol. 13, No. 7, Jul. 1995, pp. 1536-1549.

Taisuke Oguchi et al.: Integrated Polarization Diversity Front End Optics, IEEE Photonics Technology Letters, vol. 2 No. 11, Nov. 1990, pp. 830-831.
R. Langenhorst et al.: Balanced Phase and Polarization Diversity Coherent Optical Receiver, IEEE Photonics Technology Letters, vol. 3, No. 1, Jan. 1991, pp. 80-82.
N. Singh et al.: Performance of phase and polarisation insensitive receivers for coherent optical fibre communication systems, IEE Proceedings, vol. 137, Pt. J. No. 4, Aug. 1990, pp. 273-281.

(Continued)

*Primary Examiner*—Agustin Bello
(74) *Attorney, Agent, or Firm*—Jeffrey M. Measues; Borden Ladner Gervais LLP

(57) ABSTRACT

In a first broad aspect the invention provides an optical hybrid. The optical hybrid has an input for receiving an incoming optical signal containing data and a local oscillator optical signal and an output for releasing first and second output optical signals having a known phase relationship between them. In a specific and non-limiting example of implementation the phase relationship is 90 degrees. In this specific case the output signals are described as an in-phase and quadrature signals. The optical hybrid has an optical processing entity for deriving the first and second output optical signals from the incoming optical signal and the local oscillator signal. The optical processing entity including a loss element and a phase delay element for subjecting at least a component of an optical signal that exists in the processing entity to a known degree of attenuation and phase delay. The phase relationship between the output optical signals is dependant at least in part on at least one of the degree of attenuation and phase delay.

46 Claims, 5 Drawing Sheets

OTHER PUBLICATIONS

Mihajlo Stefanovic et al.: Influence of Interchannel Interference on Optical Phase Diversity FSK Systems, Facta Universitatis (NIS), Series: Electronics and Energetics vol. 11, No. 3 (1998), pp. 285-290.

Aviv Salamon et al.: Secure Optical Communications Utilizing PSK Modulation, Polarization Multiplexing and Coherent Digital Homodyne Detection With Wavelength and Polarization Agility, pp. 1-9.

C. Dorrer et al.: High-sensitivity high-resolution sampling using linear optics and waveguide optical hybrid, 2004, Optical Society of America, 3 pages.

* cited by examiner

OPTICAL HYBRID

FIELD OF THE INVENTION

The invention relates to optical hybrids that can be used in communications systems. In a first broad aspect the invention provides an optical hybrid that has a phase shift component and a loss element. Optionally, the optical hybrid is adjustable to allow tuning the phase relationship or hybrid angle between the optical signals output by the hybrid. In a second broad aspect the invention provides a polarization diversity optical hybrid that can be used in a communication system with a polarization degree of freedom.

BACKGROUND OF THE INVENTION

Currently available optical hybrids are generally unsatisfactory for a number of reasons. Prior art hybrids are complex devices suitable only for specific applications. Accordingly there is a need in the industry to provide more practical solutions that improve the cost and performance of optical hybrids.

SUMMARY OF THE INVENTION

In a first broad aspect the invention provides an optical hybrid. The optical hybrid has an input for receiving an incoming optical signal containing data and a local oscillator optical signal and an output for releasing first and second output optical signals having a known phase relationship between them. In a specific and non-limiting example of implementation the phase relationship is 90 degrees. In this specific case the output signals are described as an in-phase and quadrature signals. The optical hybrid has an optical processing entity for deriving the first and second output optical signals from the incoming optical signal and the local oscillator signal. The optical processing entity including a loss element and a phase delay element for subjecting at least a component of an optical signal that exists in the processing entity to a known degree of attenuation and phase delay. The phase relationship between the output optical signals is dependant at least in part on at least one of the degree of attenuation and phase delay.

In a second broad aspect the invention provides an optical hybrid. The optical hybrid has an input for receiving an incoming optical signal containing data and a local oscillator optical signal, and an output for releasing first and second output optical signals having a phase relationship between them. As indicated previously, in a specific and non-limiting example of implementation the phase relationship is 90 degrees. The optical hybrid has an optical processing entity for deriving the first and second output optical signals from the incoming optical signal and the local oscillator signal. The processing entity has a control input for receiving a control signal. The processing entity varies the phase relationship between the first and second output optical signals in response to the control signal.

In a third broad aspect the invention provides a polarization diversity optical hybrid. The optical hybrid has an input for receiving an incoming optical signal containing data and a local oscillator optical signal. A polarization splitter receives the incoming optical signal and the local oscillator signal and separates the incoming optical signals and the local oscillator signal in polarization states. The polarization splitter includes (1) a first output generating a first internal optical signal set including a first polarization state from the incoming optical signal and a first polarization state from the local oscillator signal, and (2) a second output generating a second internal optical signal set including a second polarization state from the incoming optical signal and a second polarization state from the local oscillator signal. A first optical processing entity receives the first internal optical signal set and derives therefrom an in-phase signal and a quadrature signal for the first polarization state of the incoming optical signal. A second optical processing entity receives the second internal optical signal set and derives therefrom an in-phase signal and a quadrature signal for the second polarization state of the incoming optical signal.

BRIEF DESCRIPTION OF THE DRAWINGS

A detailed description of examples of implementation of the present invention is provided hereinbelow with reference to the following drawings, in which.

Figure 1:
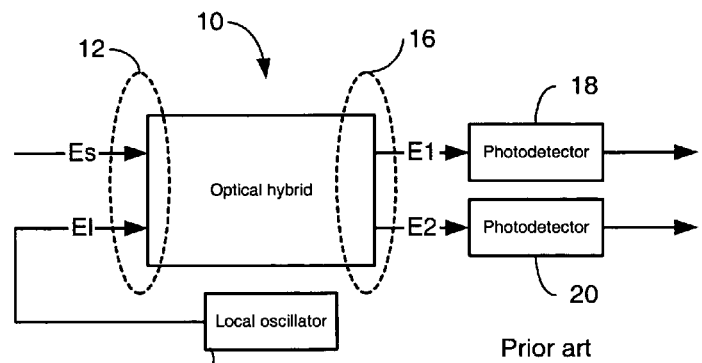
FIG. 1 is a block diagram of an optical hybrid according to a non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

Throughout the drawings, similar or identical components are designated by identical reference numerals.

DETAILED DESCRIPTION

FIG. 1 is a block diagram of a polarization diversity optical hybrid according to an example of implementation of the invention. The optical hybrid 10 has an input 12 receiving an incoming optical signal Es that contains data. The input 12 also receives optical signal El that is generated from a local oscillator 14, such as a laser. Typically signal El has a fixed polarization. The optical hybrid 10 includes an optical processing entity that processes signals Es and El and generates at its output 16 first and second output optical signals E1 and E2 that have a known phase relationship between them. The phase relationship is also described as the hybrid angle. It is common to set the hybrid angle to 90 degrees, in which case E1 and E2 are referred to as the in-phase and quadrature signals, respectively.

The E1 and E2 signals are supplied to respective photodetectors 18 and 20 that convert the light impulses into electrical signals. The outputs of the photodetectors 18 and 20 are subjected to signal processing to extract the information carried by the signal Es. Such signal processing will not be described here because it is outside the scope of this specification.

Figure 2:
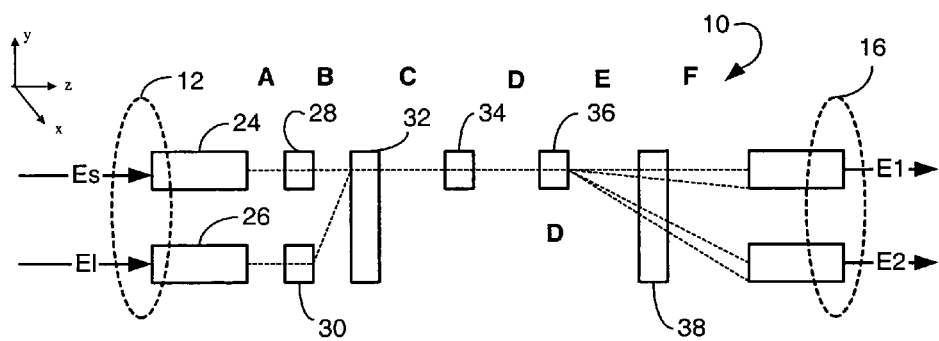
FIG. 2 is a detailed block diagram of an example of implementation of the optical hybrid shown in FIG. 1 using bulk optics.

FIG. 2 is a more detailed block diagram of the optical hybrid 10 according to an implementation using bulk optics. The optical hybrid 10 includes optical components but can also include electronic components as well.

The optical signals are received by respective Gradient Index (GRIN) lenses 24, 26 that focus the light beams on a polarization assembly including polarizers 28, 30. It should be noted that Es and El have a fixed polarization relationship that is not intended to change during the operation of the hybrid 10.

It should be expressly noted that the polarizer assembly is not essential and can be omitted without departing from the spirit of the invention.

The output of the polarizer assembly is received by a 45 degree axis rotated walk-off crystal 32 that produces an optical output containing two different polarization states. Polarization spot diagrams A, B and C illustrate the optical transformation effected by the walk off crystal 32. The solid arrow appearing adjacent the diagram C shows the walk-off crystal axis. This axis corresponds to the direction of displacement that the walk-off crystal 32 will impart to a polarization component that is parallel to this axis. In the present case, the input Es has a polarization that is orthogonal to the walk-off crystal axis, while the El input has a polarization that is parallel to the walk-off crystal axis. Accordingly, the Es input undergoes no displacement while the El input is displaced along the walk-off axis.

The optical output of the walk-off crystal axis is shown by the spot diagram C. The output has two orthogonal polarization states.

Figure 3:
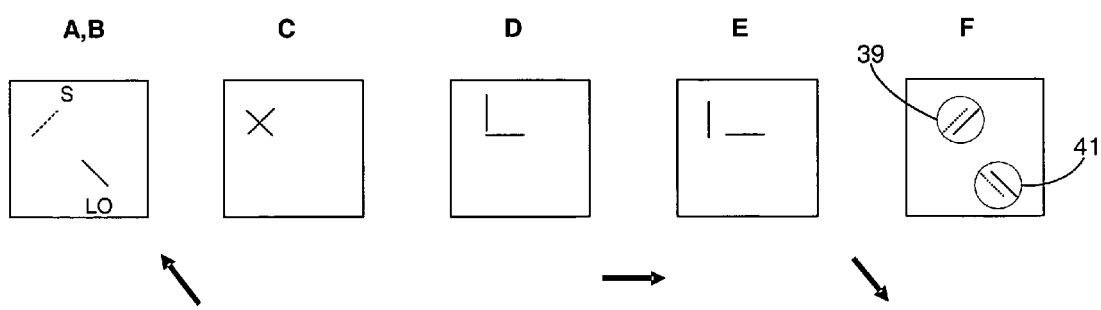
FIG. 3 is a polarization spot diagram looking down the direction of light propagation, at different locations of the optical hybrid shown in FIG. 2.

Referring back to FIG. 2, a component of the walk-off crystal 32 output, namely one of its polarization states is phase delayed and then subjected to attenuation to achieve control over the hybrid angle. Specifically, the walk-off crystal 32 output passes through a 0 degree axis birefringent crystal 34 that introduces a phase delay in one of the polarization states. The phase of the other polarization state is unaffected. Spot diagram D of FIG. 3 illustrates the relationship between the two polarization states at the output of the birefringent crystal 34. The phase delayed polarization state is shown in dotted lines.

Referring back to FIG. 2, the output of the phase delay crystal 34 is then input in a loss element 36 that will subject the phase delayed polarization state to a known degree of attenuation. This attenuation is manifested as miscoupling loss at the output. 16 in FIG. 2. As in the case of the phase birefringent crystal 34, the loss element 36 will affect only one of the polarization states. There are a number of possible ways to implement the loss element 36. One is to use a 0 degree axis walk-off crystal. Other possibilities include a Brewster angle or grazing incidence weak polarizer that can both achieve polarization dependent loss. Yet another possibility is to use an absorber or Fresnel reflection element.

The spot diagram E in FIG. 3 shows the output of the loss element 36. Note the displacement of the polarization state that is parallel to the walk-off crystal axis illustrated by the black horizontal axis near the left lower corner of diagram E.

Referring back to FIG. 2, the output of the loss element 36 is then input into a walk-off crystal 38 having a 45 degree walk-off axis. The walk-off axis is shown by the black arrow near the lower left corner of diagram F in FIG. 3. The output of the walk-off crystal 38 has two components that are now physically separated from one another. The components are designated by 39 and 41 in the diagram F. Component 39 includes two constituent elements. The first is the portion of the non-phase delayed signal that is orthogonal to the walk-off axis, and the second is the portion of the phase delayed signal that is also orthogonal to the walk-off axis. Similarly, the component 41 has two constituent elements, one being the portion of the non-phase delayed signal that is parallel to the walk-off axis while the second is the portion of the phase delayed signal that is also parallel to the walk-off axis.

The components 39 and 41 form the output signals E1 and E2, respectively.

Figure 4:
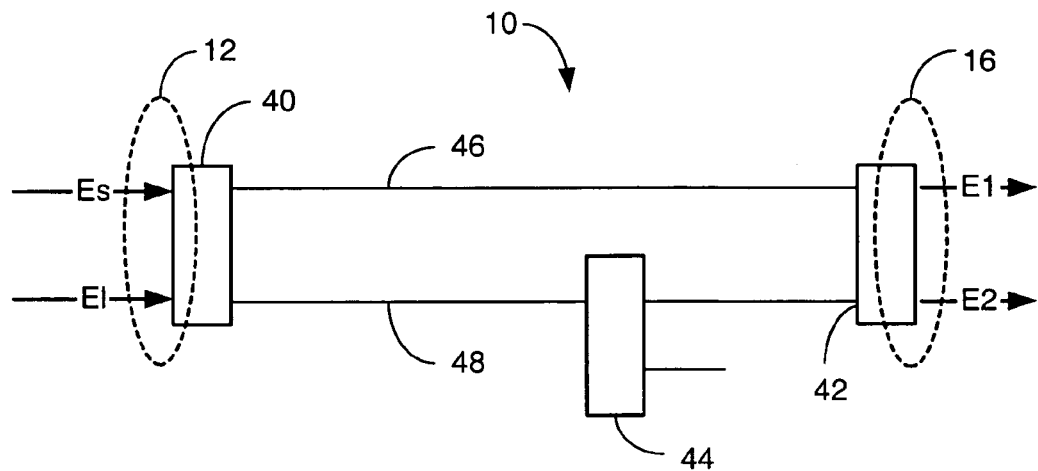
FIG. 4 is a detailed block diagram of an example of implementation of the optical hybrid shown in FIG. 1 using integrated optics.

FIG. 4 is another example of implementation of the optical hybrid 10 which uses integrated optics. The input signals Es and El are received by a 2×2 coupler 40 that provides a 50:50 signal split ratio. The coupler 40 can be a directional coupler or a Multi-Mode Interference (MMI) coupler. The first output of the coupler 40 is directed to a second coupler, coupler 42 while the second output of the coupler 40 is directed to a third coupler 44 acting as a power splitter. The optical signals are transported between the couplers 40, 42, 44 via suitable waveguides 46, 48 including transmission material such as glass, semiconductor or polymer. The waveguide 48 is designed to induce a phase delay in the optical signal leading to the coupler 44. The latter splits the signal and therefore acts as a loss element by inducing a known degree of attenuation in the signal. Note that one of the outputs of the coupler 44 is unused.

The output of the coupler 44 that is used is transported to the coupler 42, which also receives the other optical signal directly from the coupler 40. Coupler 42 releases at output 16 the signals E1 and E2.

As in the case with coupler 40, coupler 42 can be implemented as a directional coupler or a Multi-Mode Interference (MMI) coupler.

In this example, the loss element is implemented by the coupler 44 acting as a power splitter. The loss element can also be implemented by a radiation mode converter, a micromachined gap with or without an absorber or a vertical coupler, all being individually known in the art.

Figure 13:
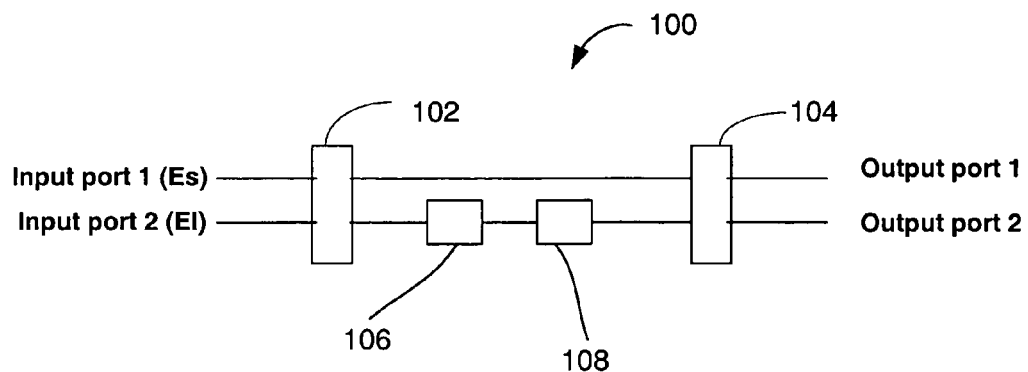
FIG. 13 is a generalized block diagram of an optical hybrid used to illustrate the theory behind some examples of implementation of the invention.

The below example is convenient for a mathematical demonstration of the effect of the loss element and phase delay on the hybrid angle. Consider the case of the hybrid 100 illustrated in FIG. 13, where the 2×2 couplers 102 and 104 are 50:50 power splitters. The output electric field of the optical hybrid 100 is related to the input electric field of the signals Es and El by the following equation:

$$\begin{bmatrix} E1out \\ E2out \end{bmatrix} = 0.5 \begin{bmatrix} 1 & -j \\ -j & 1 \end{bmatrix} \begin{bmatrix} \sqrt{L}\,e^{-j\theta} & 0 \\ 0 & 1 \end{bmatrix} \begin{bmatrix} 1 & -j \\ -j & 1 \end{bmatrix} \begin{bmatrix} Es \\ El \end{bmatrix}$$

where the parameter L denotes the fraction power loss of the loss element 108. Note that both L and θ, where θ is the phase delay induced by the phase delay element 106 are assumed here to be in the same arm of Mach-Zehnder but this need not be necessary in practice.

The phase difference (i.e. the hybrid angle A) can be derived from the above equation to be $$A = 2\tan^{-1}\{(2\sqrt{L}\sin\theta)/(1-L)\}$$

In the case where the phase delay θ is set to π/2, the hybrid angle A can be expressed as $$A = 2\tan^{-1}\{(2\sqrt{L})/(1-L)\}$$

It can be seen that by varying the parameter L, θ or both the hybrid angle A changes accordingly. The phase delay element 106 and the loss element 108 can be fixed or variable.

Figure 14:
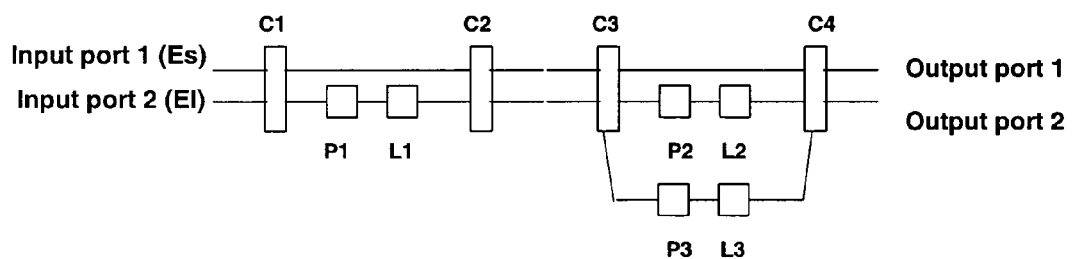
FIG. 14 is a variant of the block diagram shown in FIG. 13.

The above example could be generalized to couplers with different coupling ratios, as well as geometries with multiply-connected Mach-Zehnder interferometers, achieving the same or similar result, such as the set-up shown at FIG. 14. In that example, C1, C2, C3 and C4 designate couplers each having an arbitrary split ratio, P1, P2 and P3 designate phase delay elements that are fixed or variable and L1, L2 and L3 designate loss elements that are fixed or variable.

Figure 5:
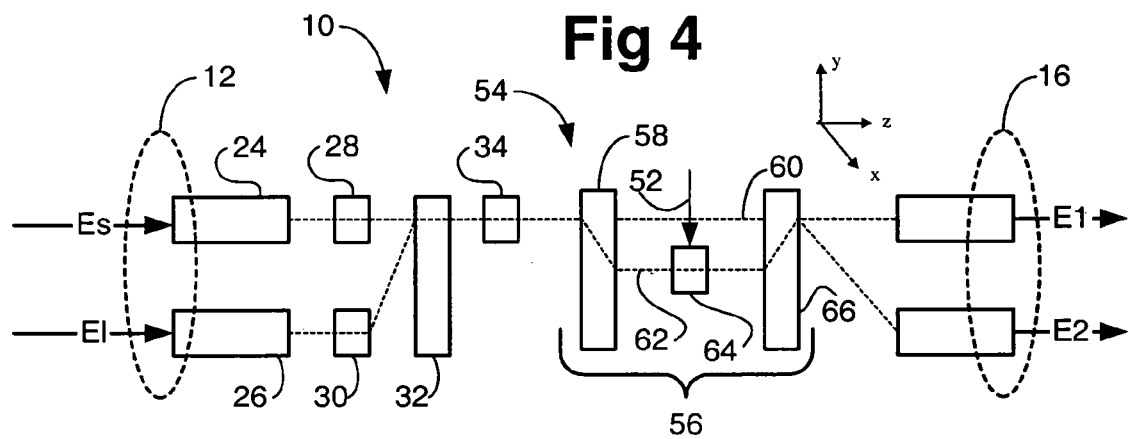
FIG. 5 is a detailed block diagram of an example of implementation of the optical hybrid shown in FIG. 1 having an adjustable hybrid angle, using bulk optics.
Figure 6:
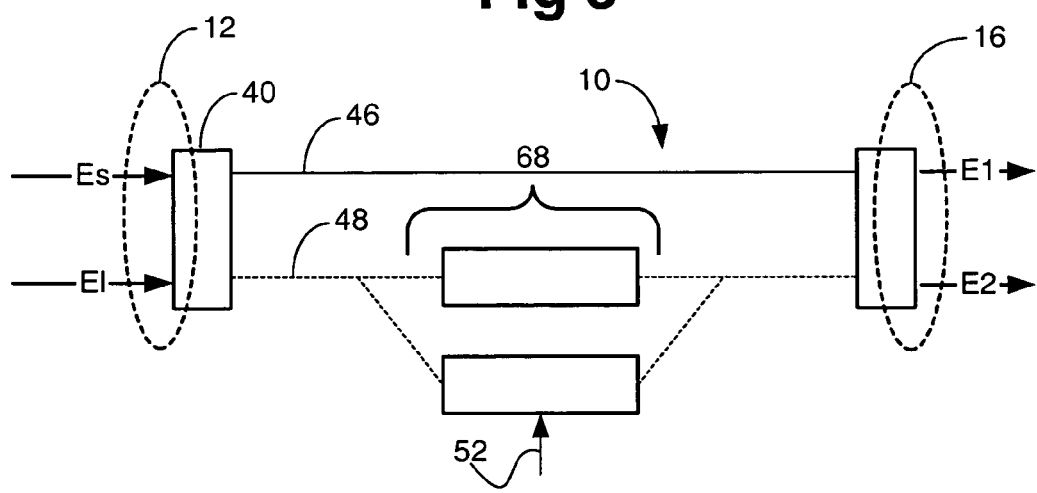
FIG. 6 is a detailed block diagram of an example of implementation of the optical hybrid shown in FIG. 1 having an adjustable hybrid angle, using integrated optics.

FIGS. 5 and 6 describe examples of implementation where the loss element is variable to allow tuning the hybrid angle. In both examples a control signal input is provided for receiving an electrical control signal for varying the loss element.

FIG. 5 provides a detailed block diagram of the optical hybrid that is similar to the example described in connection with FIG. 2 with the exception that the loss element 36 which in FIG. 2 was fixed, is replaced by a loss element 56 that is variable. The loss element 56 includes a first 0 degree axis walk-off crystal 58 that will physically direct the two polarization states along two different paths 60 and 62. The signal on path 62 is the one that will be subjected to attenuation by passing through a Variable Optical Attenuator (VOA) 64. The VOA 64 is of a type known in the art and it will not to be described in detail.

The degree of attenuation can be controlled by adjusting the VOA 64. AS shown in the drawings this is effected by the control signal at input 52. While the drawings illustrate the control signal input 52 leading directly to the VOA it should be understood that in some applications the control signal can be pre-processed such as to present the control information in a manner that is compatible with the VOA 64. For example, the control information can be expressed by modulating the voltage of the control signal.

Alternatives to the VOA 64 include liquid crystal polarization rotator and polarizer, among others.

The signal output by the VOA 64 and the signal that has not been altered which travels on path 60 are supplied to a second 0 degree axis walk-off crystal 66 that outputs signals E1 and E2.

In the example shown in FIG. 5, the phase delay element 34 is fixed but it could be replaced by a variable phase delay element that would allow tuning of the hybrid angle also. Examples of variable phase delay elements include a bulk-optic wedge, electro-optic polymer or liquid-crystal, among others.

FIG. 6 shows a variant of the optical hybrid that also allows tuning the hybrid angle. FIG. 6 is the same structure that was described in connection with FIG. 4 with the exception that the coupler 44 acting as a loss element is now replaced by a Mach-Zehnder adjustable attenuation and phase element 68. A variable Mach-Zehnder element 68 is known in the art and does not need to be described here. Specifically, the signal traveling on the waveguide 48 is split in two components, each entering a respective arm of the Mach-Zehnder element 68. Both arms of the element are coupled to the electrical control input 52a & 52b such as to allow tuning the phase shift induced between the signals flowing in each arm of the Mach-Zehnder element 68. The arm phase shifts can induce both phase and loss change of light passing through the element 68.

An alternative to using a Mach-Zehnder element is to use a variable loss/index over or under layer structure (i.e. a variable vertical coupler), a structure that manifests free carrier absorption with current injection (including materials such as silicon or polymers), among others.

The control signal applied at control input 52 of any one of the embodiments shown in FIGS. 4 and 5 can be generated in any suitable way to regulate the hybrid angle. In one possible implementation, the control signal is used to set the hybrid angle at selected values according to the intended application. In such case, the information conveyed in the control signal is produced by any suitable control device that determines what the hybrid angle should be.

Figure 7:
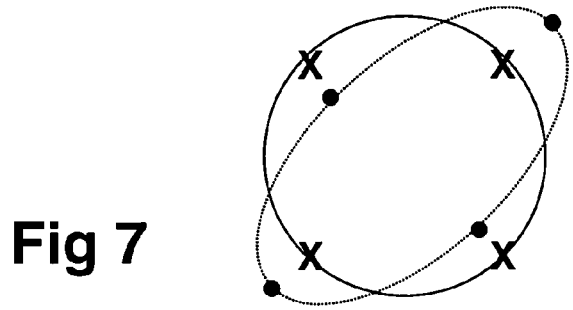
FIG. 7 is a graph representing the signal constellation corresponding to the output of the optical hybrid of FIG. 1.

In another possible application, the control signal is a feedback signal that is used to tune the hybrid angle to compensate for errors that may be occurring at the receiver using the optical hybrid or at the transmitter that has produced the signal Es. Typically, in such application, the desired hybrid angle between E1 and E2 is known, and could be, for example, 90 degrees. In practice, the actual hybrid angle may not be exactly 90 degrees due to errors occurring in the optical hybrid itself or the transmitter that has generated the signal Es. In such application some form of assessment of the actual hybrid angle is required in order to determine if it matches a nominal value and on the basis of this match derive a control signal that will provide a correction, if such correction is required. Generally, it is not practical to measure the phase difference between the output optical signals E1 and E2. It would be easier to work on the signals after they have been converted into electric signals by the photodetectors 18 and 20. Specifically, it is possible to process the electrical signals derived from E1 and E2 to create a representation of the signal constellation, as shown in FIG. 7. In that Figure, the X symbols denote locations that would correspond to instances where E1 and E2 are at 90 degrees, while the black circles show a real-case situation where the angle is not 90 degrees. On the basis of this deviation the control signal can be generated to compensate at the optical hybrid such as to produce the desired 90 degree relationship.

While the above examples have described the invention in two different modes of physical implementation, namely bulk optic that applies to embodiments in FIGS. 2 and 5, and integrated optics that applies to embodiments in FIGS. 4 and 6, other modes of implementation are possible without departing from the spirit of the invention. Another such mode is using the all-fiber implementation. In the all-fiber mode implementation, 2×2 couplers can be realized by 2×2 fused fiber couplers. A fixed loss element can be realized by using a fiber connected attenuator. A phase shift element can be realized by using a simple fiber that induces a phase delay. A variable loss element can be realized by using a VOA which is designed to connect to optical fibers and a variable phase element can be realized by using a fiber-connected phase modulator.

Finally, it should be expressly noted that forms of implementation where the optical hybrid is realized partly under one of the above described mode and partly under another mode are possible without departing from the spirit of the invention.

Figure 8:
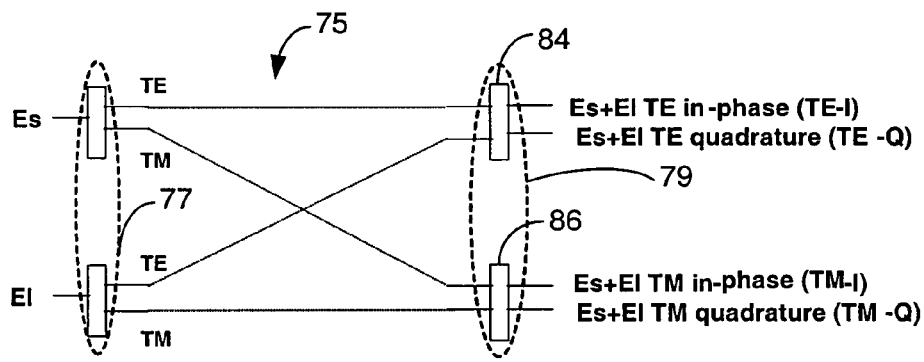
FIG. 8 illustrates the functional architecture of a polarization diversity optical hybrid according to a non-limiting example of implementation of the invention.

FIG. 8 is a functional diagram of a polarization diversity optical hybrid that uses some of the principles discussed in connection with the examples of FIGS. 1 to 7. A polarization diversity hybrid allows the mixing of an incoming signal Es of an arbitrary polarization with a local oscillator signal El having a fixed polarization. Broadly stated, the optical hybrid 75 includes a polarization splitting assembly 77 to perform polarization splitting of the input signal Es and the local oscillator signal El and a mixer assembly 79 for mixing the splitted polarization components and for extracting the E1 and E2 signals.

Figure 9:
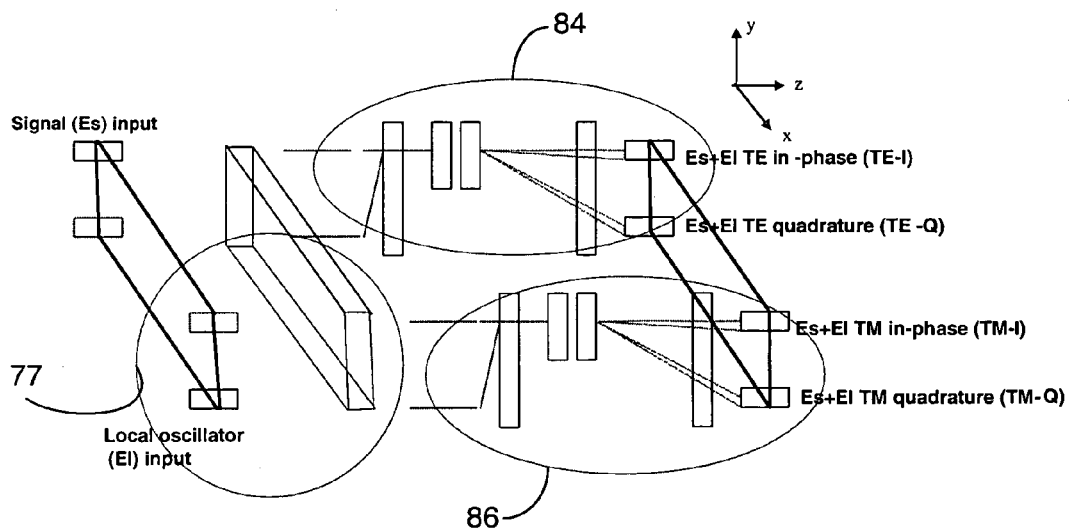
FIG. 9 is a block diagram of the polarization diversity optical hybrid shown in FIG. 8, according to an example of implementation using bulk optics.

FIG. 9 provides a more detailed block diagram of the optical hybrid 75. The polarization splitting assembly 77 is associated with a pair of optical hybrids 84, 86 that perform the actual polarization state mixing and the E1, E2 output signal extraction. In a specific example of implementation, the optical hybrids are characterized by a 90 degree hybrid angle, however this is not essential to the invention and other angles can also be used.

Figure 10:
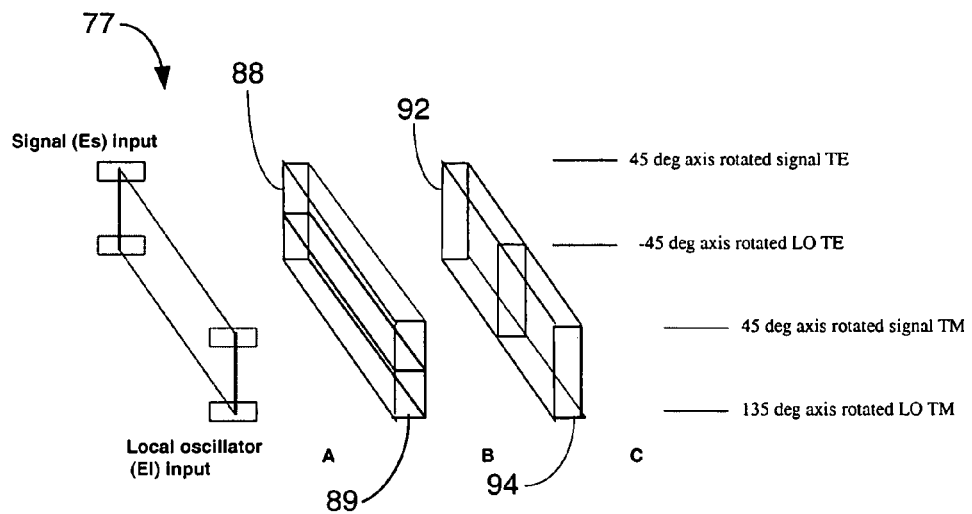
FIG. 10 is a block diagram of a polarization splitter front end of the optical hybrid shown in FIG. 9.
Figure 11:
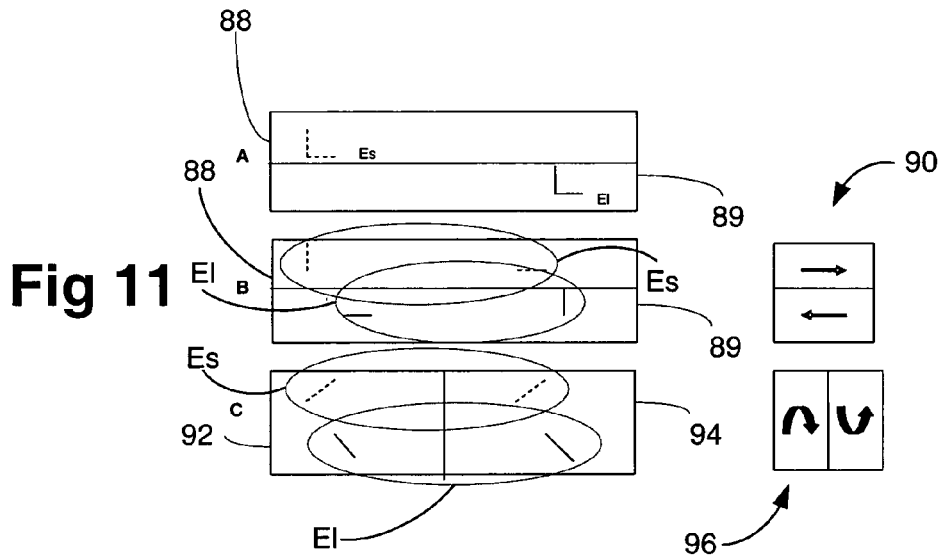
FIG. 11 is a polarization spot diagram looking down the direction of light propagation, at different locations in the polarization splitter front end shown in FIG. 10.

The polarization splitting assembly 77 is described in greater detail in FIG. 10. The polarization splitting assembly includes a pair of walk-off crystals 88 and 89, receiving Es and El, respectively. The spot diagram A in FIG. 11 shows the ingress locations of Es and El on the respective walk-off crystals. The diagram 90 also in FIG. 11 identifies the axes of the walk-off crystals 88 and 89. Diagram B illustrates the output of the walk-off crystals. It will be noted that the polarization components of the Es and El signals that are parallel to the walk-off crystal axes are displaced, while the polarization components that are orthogonal are not displaced.

Referring back to FIG. 10, the polarization splitting assembly includes a pair of half-wave plates 92, 94 that impart a rotation angle to the outputs of the walk-off crystals 88 and 89. The diagram 96 in FIG. 11 shows the respective rotation angles of the half-wave plates 92, 94. The spot diagram C shows the output of the half-wave plates 92, 94. Specifically, the output of the half-wave plate 92 includes two orthogonal polarization components from Es and El, respectively, while the output of the half-wave plate 94 includes the two other orthogonal polarization components from Es and El. It will be noted that the output of each half-half wave plate 92, 94 is the same in terms of geometric relationship between the light beams as the input of the optical hybrid 10 described earlier. See for example the spot diagram A, B of FIG. 3.

The hybrids 84, 86 that receive the respective outputs of the half-wave plates 92, 94 perform the same optical signal processing as described in connection with FIG. 1 and for the sake of brevity the explanation will not be repeated here.

From a functional point of view, the polarization splitting assembly 77 receives the Es and El signals and through the processing described earlier outputs two sets of signals. The first set includes a 45 degree axis rotated Es Transverse Electric (TE) signal and a 135 (−45) degree axis rotated El TE signal. The first set egresses the half-wave plate 92. The second set includes a 135 (−45) degree axis rotated Es Transverse Magnetic signal and a 45 degree axis rotated El TM signal. The second set of signals egresses the half-wave plate 94.

The processing of the signal sets by the optical hybrids 84 and 86 will produce two sets of in-phase and quadrature signals, assuming the hybrid angles to be 90 degrees. Specifically, the optical hybrid 84 outputs Es+El TE in-phase (TE-I) and Es+El TE quadrature signal (TE-Q), while the optical hybrid outputs Es+El TM in-phase (TM-I) and Es+El TM quadrature signal (TM-Q).

Figure 12:
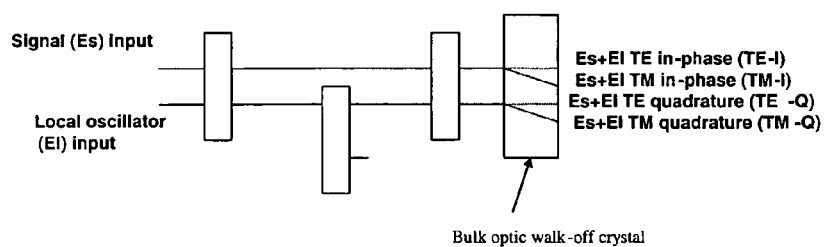
FIG. 12 is a block diagram of the polarization diversity optical hybrid shown in FIG. 8, according to an example of implementation using hybrid/planar/bulk optics.

FIG. 12 illustrates another form of implementation of the polarization diversity hybrid shown at FIG. 8. The implementation in FIG. 12 is functionally similar to the description above in that the orthogonal polarization components of the Es and El signals are mixed into optical hybrids. This implementation uses integrated optics and functions similarly to the embodiment described in connection with FIG. 4.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. An optical hybrid, comprising:
    an input element for combining a data input optical signal and a local oscillator input optical signal and for splitting the combined input optical signals into first and second internal optical signals;
    an output element for recombining the internal optical signals and for splitting the combined internal optical signals into output optical signal components having a known phase relationship therebetween; and
    at least one phase delay element and at least one loss element connected between the input element and the output element, the phase delay element configured to apply a known phase delay to one of the internal optical signals and the loss element configured to apply a known attenuation to one of the internal optical signals;
    the known phase relationship being dependent, at least in part, on both the known phase delay and the known attenuation, wherein the phase delay element and the loss element co-operate to introduce said known phase relationship.

2. An optical hybrid as defined in claim 1, wherein said loss element subjects said first internal optical signal to the known degree of attenuation with relation to the second internal optical signal.

3. An optical hybrid as defined in claim 2, wherein said loss element includes a coupler acting as a power splitter.

4. An optical hybrid as defined in claim 3, wherein said coupler is a first coupler, said output element including a second coupler that releases the first and second output optical signals.

5. An optical hybrid as defined in claim 4, wherein said second coupler is a 2×2 coupler.

6. An optical hybrid as defined in claim 4, wherein said second coupler is an MMI coupler.

7. An optical hybrid as defined in claim 1, wherein said loss element is selected in the group consisting of optical absorber, Fresnel reflection device, walk-off device, Brewster angle polarizer, grazing incidence weak polarizer, liquid crystal polarization rotator and polarizer, power splitter, radiation mode converter, micro-machined gap, nested Mach-Zehnder device, variable vertical coupler and free-carrier absorption device with current injection.

8. An optical hybrid as defined in claim 1, wherein said phase delay element is selected in the group consisting of phase delay crystal, birefringent crystal, waveguide, bulk-optic wedge, electro-optic polymer, electro-optic liquid crystal, linear electro-optic effect phase modulator and current injection device.

9. An optical hybrid as claimed in claim 1 wherein said phase delay element and said loss element are configured such that the known phase relationship (A) is $$A = 2\tan^{-1}\{(2\sqrt{L}\sin\theta)/(1-L)\}$$

wherein L=said known attenuation and wherein θ=said known phase delay.

10. An optical hybrid as defined in claim 1, wherein said input element includes a coupler.

11. An optical hybrid as defined in claim 1, wherein the first and second output optical signals are in-phase and quadrature signals, respectively.

12. An optical hybrid as defined in claim 1, wherein said input element includes an optical component receiving said incoming optical signal and said local oscillator optical signal and producing said first and second internal optical signals having first and second polarization states.

13. An optical hybrid as defined in claim 12, wherein said loss element subjects the first polarization state to the known degree of attenuation with respect to the second polarization state.

14. An optical hybrid as defined in claim 13, wherein said phase delay element subjects the first polarization state to the known phase delay before the first polarization state is subjected to the known degree of attenuation.

15. An optical hybrid as defined in claim 13, wherein said input element includes a focalization lens assembly for receiving the incoming optical signal containing data and the local oscillator optical signal.

16. An optical hybrid as defined in claim 15, wherein said focalization lens assembly includes a GRIN lens.

17. An optical hybrid as defined in claim 15, wherein said input element includes a polarizer assembly receiving signals output by said focalization lens assembly.

18. An optical hybrid as defined in claim 1, wherein said loss element is adjustable to vary the phase relationship between the first and second output optical signals.

19. An optical hybrid as defined in claim 18, wherein said optical hybrid further includes a control input for receiving a control signal, said loss element being responsive to the control signal to vary the degree of attenuation and hence to vary the phase relationship.

20. An optical hybrid as defined in claim 19, wherein the control signal is an electrical signal.

21. An optical hybrid as defined in claim 1, wherein said phase delay element is adjustable to vary the phase relationship between the first and second output optical signals.

22. An optical hybrid as defined in claim 21, wherein said optical hybrid further includes a control input for receiving a control signal, said phase delay element being responsive to the control signal to vary the degree of phase delay.

23. An optical hybrid as defined in claim 22, wherein the control signal is an electrical signal.

24. An optical hybrid, comprising:
a) input means for receiving an incoming optical signal containing data and a local oscillator optical signal;
b) output means for releasing first and second output optical signals having a known phase relationship between them;
c) an optical processing means for deriving the first and second output optical signals from the incoming optical signal and the local oscillator signal, said optical processing means including a loss inducing means and a phase delay means for subjecting at least a component of an optical signal in said processing means to a known degree of attenuation and a known degree of phase delay, the phase relationship being dependant at least in part on the degree of attenuation and phase delay, wherein both the known degree of attenuation and the known degree of phase delay are configured to produce said known phase relationship.

25. An optical hybrid, comprising:
a) an input for receiving an incoming optical signal containing data and a local oscillator optical signal;
b) an output for releasing first and second output optical signals having a phase relationship between them;
c) an optical processing entity for deriving the first and second output optical signals from the incoming optical signal and the local oscillator signal, said processing entity having a control input for receiving a control signal, said processing entity varying the phase relationship between the first and second output optical signals in response to the control signal, said optical processing entity including a loss element for subjecting at least a component of an optical signal in said processing entity to a degree of attenuation, said processing entity varying the degree of attenuation in response to the control signal to vary the phase relationship between the first and second output optical signals.

26. An optical hybrid as defined in claim 25, wherein the control signal is an electrical signal.

27. An optical hybrid as defined in claim 26, wherein said optical processing entity includes a component receiving said incoming optical signal and said local oscillator optical signal and producing first and second internal optical signals.

28. An optical hybrid as defined in claim 27, wherein said loss element subjects said first internal optical signal to the degree of attenuation with relation to the second internal optical signal.

29. An optical hybrid as defined in claim 27, wherein said first and second internal optical signals have first and second polarization states.

30. A polarization diversity optical hybrid, comprising:
a) an input for receiving an incoming optical signal containing data and a local oscillator optical signal;
b) a polarization splitter for receiving the incoming optical signal and the local oscillator signal, said polarization splitter separating the incoming optical signals and the local oscillator signal in polarization states, said polarization splitter including:
  i) a first output generating a first internal optical signal set including a first polarization state from the incoming optical signal and a first polarization state from the local oscillator signal;
  ii) a second output generating a second internal optical signal set including a second polarization state from the incoming optical signal and a second polarization state from the local oscillator signal;
c) first optical processing entity receiving the first internal optical signal set for deriving from the first internal optical signal set an in-phase and quadrature signal for the first polarization state of the incoming optical signal; and
d) second optical processing entity receiving the second internal optical signal set for deriving from the second internal optical signal set an in-phase and quadrature signal for the second polarization state of the incoming optical signal;
wherein both of said optical processing entities includes a loss element and a phase delay element for subjecting at least a component of an optical signal in said processing entity to a known degree of attenuation and phase delay, the phase relationship between the in-phase and quadrature signal being dependant at least in part on the degree of attenuation and phase delay.

31. A polarization diversity optical hybrid as defined in claim 30, wherein the incoming optical signal has an arbitrary polarization.

32. A polarization diversity optical hybrid as defined in claim 31, wherein the local oscillator optical signal has a fixed polarization.

33. A polarization diversity optical hybrid as defined in claim 30, wherein the first polarization state from the incoming optical signal and the first polarization state from the local oscillator signal are orthogonal in the first internal optical signal set.

34. A polarization diversity optical hybrid as defined in claim 30, wherein the second polarization state from the incoming optical signal and the second polarization state from the local oscillator signal are orthogonal in the second internal optical signal set.

35. A polarization diversity optical hybrid as defined in claim 30, wherein said polarization splitter includes a walk-off crystal associated with each of the incoming optical signal and local oscillator signal.

36. A polarization diversity optical hybrid as defined in claim 35, wherein said polarization splitter includes a half-wave plate to cause an angular displacement of the first polarization state from the incoming optical signal and the first polarization state from the local oscillator signal.

37. A polarization diversity optical hybrid as defined in claim 36, wherein said half-wave plate is a first half-wave plate, said polarization splitter includes a second half-wave plate to cause an angular displacement of the second polarization state from the incoming optical signal and the second polarization state from the local oscillator signal.

38. A polarization diversity optical hybrid as defined in claim 30 wherein said loss element subjects the first/second polarization state from the incoming optical signal to the known degree of attenuation with respect to the first/second polarization state from the local oscillator signal.

39. A method for processing optical signals, comprising
combining a data input optical signal with a local oscillator input optical signal and splitting the combined input optical signals into component optical signals;
recombining the component optical signals and splitting the combined component optical signals into output optical signal components having a known phase relationship therebetween; and
after said combining step, and prior to said recombining step, applying a known phase delay to one of the component optical signals and a known attenuation to one of the component optical signals; wherein the known phase relationship is dependent, at least in part, on the known phase delay and the known attenuation and wherein said known phase delay and the known attenuation are both selected to produce said known phase relationship.

40. A method as defined in claim 39, wherein the first and second optical signals are in-phase and quadrature signals, respectively.

41. A method as defined in claim 39, including varying the degree of attenuation to vary the phase relationship between the first and the second optical signals.

42. A method as defined in claim 41, including varying the degree of attenuation in response to a control signal.

43. A method as defined in claim 42 wherein the control signal is an electrical signal.

44. A method as defined in claim 41, including varying the degree of phase delay in response to a control signal.

45. A method as defined in claim 44 wherein the control signal is an electrical signal.

46. A method as defined in claim 39, including varying the degree of phase delay to vary the phase relationship between the first and the second optical signals.

* * * * *